Nov. 1, 1966 K. E. SNYDER 3,282,385
DEVICE FOR CONTROLLING RATE OF ENGAGEMENT
OF HYDRAULIC CLUTCH
Filed Aug. 31, 1964 2 Sheets-Sheet 1
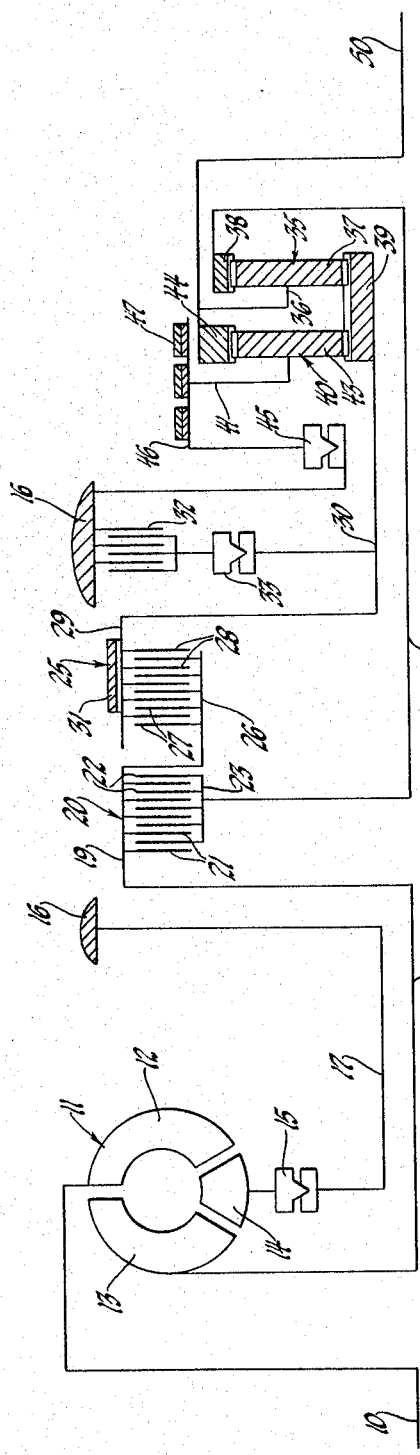
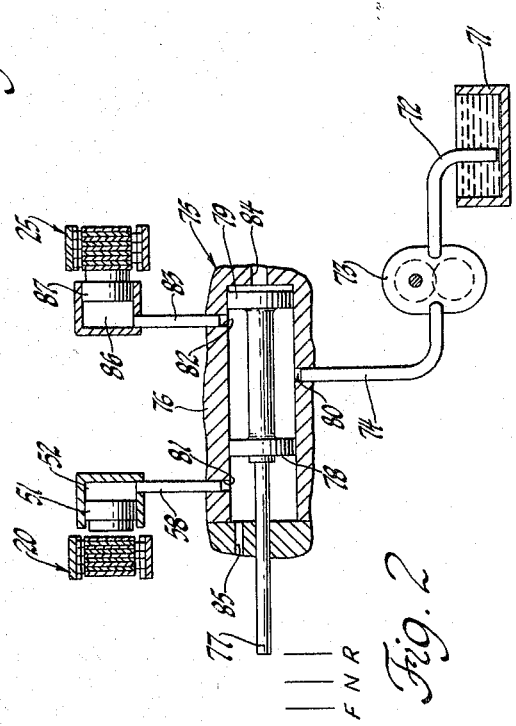
INVENTOR.
Kenneth E. Snyder
BY
Robert L. Spencer
ATTORNEY INVENTOR.
Kenneth E. Snyder
BY
Robert L. Spencer
ATTORNEY

United States Patent Office 3,282,385
Patented Nov. 1, 1966

3,282,385
DEVICE FOR CONTROLLING RATE OF ENGAGEMENT OF HYDRAULIC CLUTCH
Kenneth E. Snyder, Northville, Mich., assignor to General Motors Corporation, Detroit, Mich., a corporation of Delaware
Filed Aug. 31, 1964, Ser. No. 393,289
8 Claims. (Cl. 192—85)

This invention relates to clutch control valving and more particularly to such valving for use in connection with an engageable and releasable automatic transmission clutch.

In automatic transmissions it is common practice to provide a clutch adapted to be released to establish neutral or no-drive operation and to be engaged to establish drive. In some transmission arrangements the clutch may be engaged to establish forward drive only, and in others to establish either forward or reverse drive. The invention may be employed in either type of arrangement. Such automatic transmission clutches are commonly controlled by a manually operable selector valve adapted to be positioned to select forward, neutral or reverse operation. It has been found that upon shift from neutral to drive operation the conventional clutch engagement is very rapid with objectionable transmission jar or torque reaction bump. The rapid clutch engagement is particularly noticeable and objectionable when starting from a cold start with the vehicle engine conditioned for fast idle of operation.

The improved clutch control valving disclosed herein provides for smooth clutch engagement upon shift from neutral to drive and greatly minimizes the torque reaction bump of conventional clutch arrangements.

The improved valving further varies the rate of clutch engagement in accordance with changes in engine torque demand to prevent excessive clutch slip and to prolong useful clutch life.

The valving incorporates a fixed restricted feed to the clutch actuator piston together with a second feed controlled as a function of clutch apply pressure and speed of rotation of the clutch drum to provide initial rapid feed of pressure fluid to the clutch and to reduce the rate of feed upon rise of clutch apply pressure.

An additional rapid clutch exhaust valve is effective upon shifting of the drive range selector valve to neutral to by-pass the fixed restriction for rapid exhaust of clutch apply pressure.

In the initial stage of clutch engagement, fluid pressure is rapidly delivered to the clutch piston to initiate clutch engagement. Upon rise of pressure in the clutch apply chamber due to resistance to movement of the clutch parts upon contact thereof with each other, pressure in the clutch apply chamber rises to move a valve to a cutoff position to thereafter effect admission of fluid pressure to the clutch apply chamber through a restriction to complete clutch engagement. Movement of the valve to its cutoff position is determined by line pressure acting on one surface of the valve tending to open the valve, by centrifugal force tending to open the valve, and by pressure in the clutch apply chamber acting upon a second valve surface of greater effective area than the first valve surface and tending to close the valve.

These and other features and advantages of this invention will be apparent from the following specification and claims taken in conjunction with the accompanying drawings in which:

FIGURE 1 is a schematic diagram of a transmission incorporating the features of this invention.

FIGURE 2 is a schematic diagram illustrating a manual valve adapted to be positioned to selectively engage and release a clutch.

Figure 3:
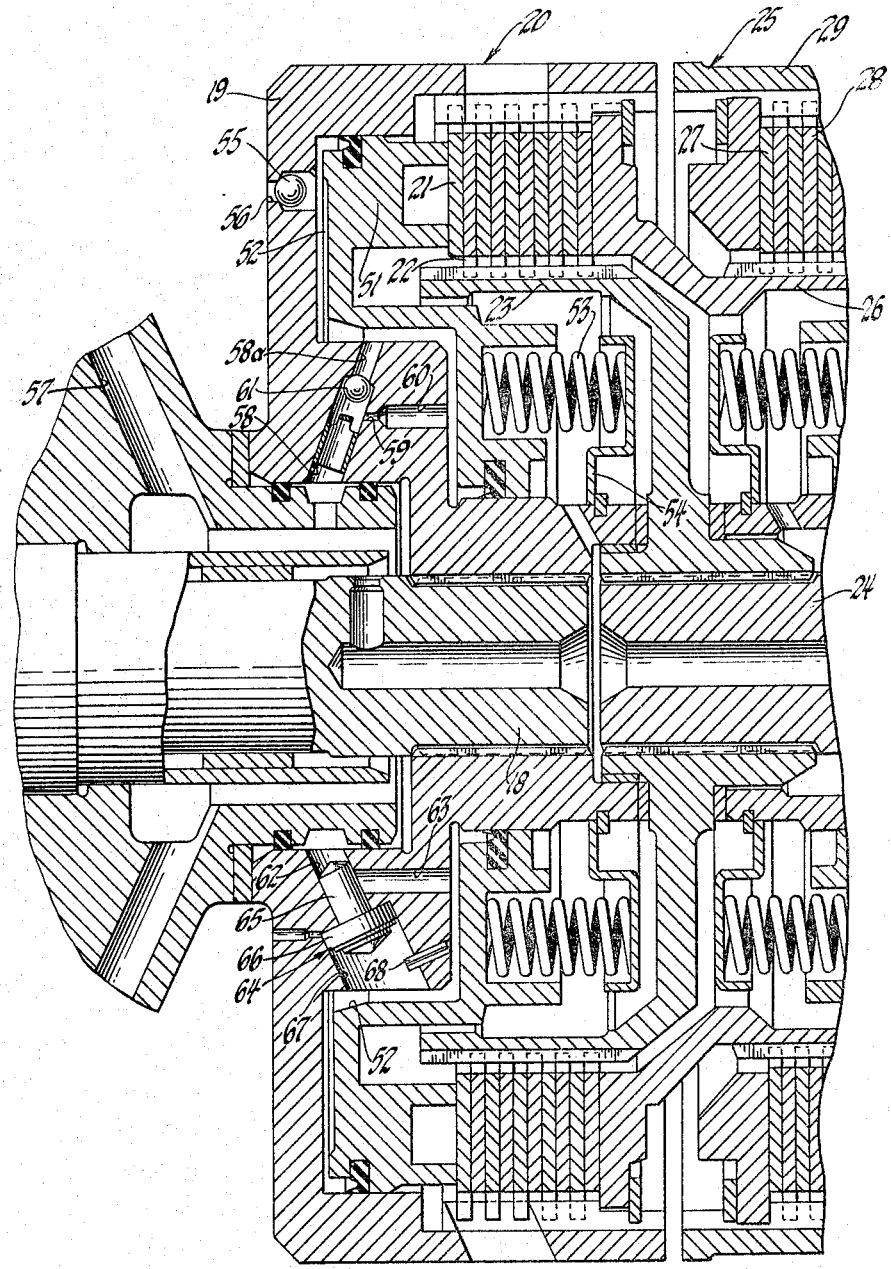
FIGURE 3 is a sectional view through a transmission illustrating the valving positioned in the rotatable clutch drum.

Referring to FIGURE 1, there is shown one transmission of the type to which the present invention may be applied.

An engine driven power input shaft 10 drives an impeller 12 of a hydraulic torque converter indicated generally at 11. Converter 11 also includes a power delivery turbine 13 and a bladed reaction member 14. A one-way brake 15 prevents reverse rotation of reaction member 14 and permits forward rotation of the same. One-way brake 15 is grounded to the transmission case 16 through a ground sleeve shaft 17. A turbine driven shaft 18 drives a clutch drum 19 of a forward drive clutch 20. Drive clutch discs 21 are adapted to be engaged to driven clutch discs 22 on a driven clutch hub 23 to establish forward drive and to be released to establish neutral or no-drive operation. A power transfer shaft 24 is driven when clutch 20 is engaged.

A second clutch 25 includes a clutch drum 26 driven by drum 19 and drives drive clutch discs 27. A driven clutch hub 29 carrying driven clutch discs 28 is connected to a pair of sun gears 39 by means of a shaft 30. Drum 29 may be braked against forward rotation by a brake band 31. Shaft 30 may be braked against reverse rotation by means of an engageable and releasable control brake 32 and a one-way brake 33 in series.

A planetary gearing system comprises a first planetary gearing unit 35 including a planet carrier 36 supporting a planet pinion gear 37 in mesh with a ring gear 38 and a sun gear 39 and a second planetary gearing unit 40 including a planet carrier 41 supporting a planet pinion gear 43 in mesh with a ring gear 44 and sun gear 39. Planet carrier 36 is fixed for rotation as a unit with ring gear 44 and a final power delivery shaft 50. A one-way brake 45 prevents reverse rotation of a drum 46 fixed for rotation with carrier 41 and permits forward rotation of the same. An overrun brake 47 may be applied to drum 46 to prevent forward rotation of the drum and carrier 41 for overrun braking purposes and is also applied to establish reverse drive.

The planetary gearing system may be controlled to provide three forward drive ratios, neutral, and reverse.

For neutral operation all brakes and clutches are released. Forward drive clutch drum 19 and direct drive clutch hub 26 may be driven by converter 11, but with clutches 20 and 25 released, no torque will be transmitted to the planetary gearing system.

For first gear forward drive ratio, clutch 20 and overrun brake 47 are engaged. Power is transmitted through forward clutch 20, shaft 24, to ring gear 38. Reduction drive is through both gear units including sun gear 39 to pinion gear 43 and ring gear 44. Planet carrier 36 rotates forwardly at the speed of rotation of final power delivery shaft 50. Planet carrier 41 is held from reverse rotation by one-way brake 45. Overrun brake 47 may be applied to drum 46 to prevent forward rotation of carrier 41.

For second speed forward drive, clutch 20 remains engaged. Brakes 31 and 32 are applied and brake 47 is released. Power input is to ring gear 38 through clutch 20 and shaft 24. One-way brake 33 prevents reverse rotation of sun gear 39 and overrun brake 31 prevents forward rotation of sun gear 39. Drive is at reduction drive ratio of gear unit 35.

For direct drive forward, clutches 20 and 25 are engaged and brakes 31 and 47 released. Power input is to ring gear 38 through clutch 20 and to sun gear 39 through clutch 25 for direct drive.

For reverse drive ratio, forward clutch 20 is released, clutch 25 engaged, and brake 47 is applied to drum 46.

Drive is through sun gear 39, pinion gear 43 to ring gear 44.

The clutches and brakes are fluid pressure responsive and may be controlled by conventional drive ratio control valving.

The improvement comprising the present invention is best shown in FIGURE 3, wherein parts corresponding to those of FIGURE 1 are given the same reference numerals as those of FIGURE 1.

Clutch drum 19, driven by shaft 18 of FIGURE 1 drives a series of drive clutch discs 21 adapted to engage and to be released from driven discs 22. A piston 51 is adapted to engage clutch 20 in response to fluid pressure admitted to a chamber 52 between piston 51 and clutch drum 19. A spring 53 seated upon a spring seat 54 on clutch drum 19 biases piston 51 towards its clutch release position. A ball dump valve 55 positioned in the outer zone of chamber 52 will normally be closed by pressure admitted to chamber 52 and will normally open in response to centrifugal force upon release of pressure from chamber 52 to dump residual fluid from the outer zone of chamber 52 through an exhaust port 56 formed in the side wall of drum 19.

A fluid pressure supply passage may be supplied with fluid under pressure to establish forward drive or may be connected to exhaust to establish neutral. Pressure fluid is admitted to chamber 52 through two fluid flow paths. Fluid from passage 57 is conducted through a first path through a passage 58, restriction 59 and passage 60 to chamber 52. A quick dump ball valve 61 will normally be closed upon admission of pressure to passage 58 to block off passage extension 58a from passage 58.

Upon release of pressure from passage 57, ball valve 61 will open to permit fluid being exhausted from chamber 52 to bypass restriction 59 by way of passage 58a.

Line pressure from passage 57 is also admitted to chamber 52 through passages 62, 63 controlled by a valve 64. Valve 64 includes a reduced stem 65 slidable in passage 62 and an enlarged head 66 movable in an enlarged passage 67. A pin 68 extending into passage 67 limits the permissible range of travel of valve 64. Passage 67 is connected to chamber 52.

In operation, assuming that pressure is admmited to passage 57 to engage clutch 20, line pressure, acting upon the end of the reduced stem 65, moves valve 64 outwardly against pin stop 68 to permit initial unrestricted flow of fluid to chamber 52 to provide initial engagement of clutch discs 21, 22. At this time during initial movement of piston 51 and initial contact of clutch discs 21, 22, very little fluid flow occurs through restriction 59. As the clutch discs come into engagement with consequent resistance to movement of piston 51, a rise of pressure in chamber 52 occurs. This pressure acting on the end of head 66 biases the valve 64 to move inwardly to block off passage 63 from passage 62. With valve 64 in the position shown, completion of clutch engagement will be accomplished by fluid pressure admitted to chamber 52 through restricted passage 60 and restriction 59.

It will be apparent that line pressure acting on the end of reduced stem 65 plus centrifugal force due to rotation of hub 19 tend to move valve 64 toward stop pin 68 to permit unrestricted fluid flow from passage 62 to passage 63. Clutch apply pressure in chamber 52 reacts on the end of relatively large diameter head 66 to apply a thrust to valve 64 opposing the thrust on the end of stem 65 and centrifugal force effect and tending to move the valve to its cutoff position wherein passage 62 is blocked off from passage 63 as illustrated. In the assembly, the clutch discs 21 are of a wave washer type adapted to be flattened when fully engaged, as shown. The clutch plates act as a mechanical accumulator in the initial engagement stage during which they are being flattened by piston 51 in response to rise of pressure in chamber 52. The plates are designed such that piston 51 must apply a thrust of approximately 1400 pounds to completely flatten the clutch plates or discs. Complete engagement of the discs occurs in two stages. In the first stage valve 64 permits rapid initial fluid flow to chamber 52 to permit rapid build up of pressure in chamber 52 just sufficient to engage the discs with a thrust adeqate to lightly engage the discs with sufficient force that the discs are capable of transmitting torque at zero throttle or engine idle. Valve 64 then closes in response top ressure rise in chamber 52. Completion of clutch engagement is accomplished by line pressure supplied to chamber 52 through restriction 59. Valve 64 moves to its cutoff position by rise of clutch apply pressure in chamber 52. At speeds of rotation below 700 r.p.m. which corresponds to cold engine fast idle speeds, the centrifugal force effect of the rotation of valve 64 is negligible so that valve 64 will move to its cutoff position at relatively low clutch apply pressure in chamber 52, to render restricted passage 60 effective. However, at speeds of rotation of drum 19 above 700 r.p.m. the centrifugal force effect causes valve 64 to delay movement to its cutoff position to rapidly build up pressure in chamber 52 by permitting fluid flow through passage 63 for a longer period of time than at speeds below 700 r.p.m. It will readily be understood that since the speed of rotation of drum 19 depends upon engine speed, which is a function of engine torque demand, that for a given line pressure supplied to passage 62, the initial clutch apply pressure is controlled as a function of torque demand. In automatic transmissions it is common practice to vary the line pressure as a function of torque demand to increase the line pressure in response to increase in torque demand.

In the present case, it is contemplated that line pressure will vary with torque demand. The initial clutch apply pressure will vary in accordance with line pressure and speed of rotation of drum 19. Completion of clutch engagement is accomplished by supplying pressure to chamber 52 through passage 58, restriction 59 and passage 60 after valve 64 has moved to its cutoff position to block passage 63 from passage 62.

The arrangement has been found to be advantageous both from the standpoint of reducing clutch engagement shock and from the standpoint of clutch durability. The arrangement wherein valve 64 is responsive to centrifugal force and line pressure to delay its movement to its cutoff position assures adequate pressure in clutch apply chamber 52 to avoid clutch burning particularly when engaging the clutch at relatively heavy throttle. The quick dump valve 61 is particularly useful to provide rapid release of clutch 20 when shifting from forward to reverse. At times, rapid shift from forward to reverse and vice versa is desirable, particularly to accomplish rocking motion of the vehicle to get the vehicle in motion when stuck in sand or snow. This rapid shift may occur at relatively heavy throttle, and valve 64 prevents clutch burn under such conditions of operation and in cooperation with restriction 59 provides smooth clutch engagement.

While the arrangement has been described only in connection with forward drive clutch 20 it will readily be understood that it may be incorporated in clutch 25, if desired.

As stated, valve 64 provides rapid initial fill of clutch apply chamber 52 until pressure in chamber 52 is adequate to lightly engage clutch discs 21, 22, with sufficient force to carry torque at zero throttle, light torque demand operation. Valve 65 then moves to its cutoff position to render restriction 59 effective to complete pressure build up in chamber 52. At speeds below a predetermined speed, for example, 700 r.p.m., the centrifugal force effect of rotation of drum 19 is negligible. Thus very smooth light throttle clutch engagement is accomplished. However, at higher speeds of rotation the centrifugal force effect delays movement of valve 64 to its cutoff position to assure adequate pressure rise in chamber 52 to prevent clutch burn to assure adequate clutch life. Thus the initial pressure in chamber 52 is controlled as a function of line pressure in passage 62 which may vary with torque demand, and with speed of rotation of drum 19. In either speed range of rotation completion of clutch engagement occurs after valve 64 is moved to its cutoff position by fluid flow through restriction 59.

In FIGURE 2 there is shown schematically a manual selector valve adapted to select forward, neutral or reverse. An engine driven pump 73 draws fluid under pressure from a sump 71 through a suction passage 72 and delivers fluid under pressure to a supply passage 74. Pressure in passage 74 may be regulated by a regulator valve (not shown) to vary with engine torque demand in a conventional manner as taught in the patent to Winchell 3,003,367.

A drive range selector valve 75 includes a housing 76 having a movable valve member 77 having spaced lands 78, 79 disposed in a bore in housing 76. Pressure is supplied to a port 80 through a line pressure supply passage 74 and may be controlled to increase with increase in engine torque demand by a conventional line pressure regulator valve (not shown) as taught by the aforementioned Winchell patent. With valve 75 conditioned for neutral operation, passage 74 will be blocked off from clutches 20 and 25. Clutch chamber 52 will be connected to exhaust through valve ports 81 and 85. Clutch chamber 86 will be connected to exhaust through ports 82 and 84. With valve 75 positioned for forward operation, line pressure will be admitted to chamber 52 through port 81 and passage 58 to engage forward drive clutch 20. Clutch apply chamber 86 of clutch 25 will be connected to exhaust through passage 83 and ports 82 and 84 to permit piston 87 to release clutch 25. With valve 75 positioned for reverse operation, chamber 52 of clutch 20 will be connected to exhaust through ports 81 and 85 to release clutch 25 and fluid pressure will be admitted to clutch apply chamber 86 through ports 80, 82 and passage 83. While the specific improvement including valve 64 and restriction 59 has been described as being incorporated in forward drive clutch 20, it will be understood that similar structure may be incorporated in reverse drive clutch 25 as well.

It will further be understood that dump valve 61 will be seated to block off branch passage 58a in response to pressure delivered to passage 58 by manual valve 75. Upon exhaust of pressure from passage 58 by valve 75, fluid pressure in chamber 52 will unseat valve 61 to permit rapid exhaust of pressure from chamber 52, bypassing restriction 59 and permitting exhaust of fluid through branch 58a. This is necessary to prevent undue delay of exhaust of pressure in chamber 52 as would occur were it necessary to exhaust the pressure through restriction 59. Dump valve 56 would be prevented from unseating quickly due to pressure in chamber 52. The arrangement permits quick dump of fluid from chamber 52 both through valve 61 and valve 56. The valve 56 is unseated by centrifugal force due to rotation of drum 19 upon drop of pressure in chamber 52 permitted by valve 61. Valve 64 is biased towards its open position by centrifugal force due to rotation of drum 19 and by line pressure acting on the end surface of stem 65 and is biased towards its closed position by pressure in chamber 52 acting on land 66. It is apparent that the area of land 66 responsive to pressure in chamber 52 is greater than the area of the surface of stem 65 responsive to line pressure in passage 62. Valve 64 moves to its closed position to block off flow of fluid through passage 62-63 upon partial clutch engagement so that completion of clutch engagement is accomplished by fluid flow to chamber 52 through restriction 59 after valve 64 has moved to its closed position.

What is claimed is:

1. In a transmission, a rotatable clutch drum, an engageable and releasable clutch, fluid pressure responsive means for engaging and releasing said clutch forming with said drum a chamber adapted to receive fluid under pressure to engage said clutch, a fluid pressure source, a valve connected to said source for controlling admission of pressure to and exhaust of pressure from said chamber, passage means connecting said valve to said chamber including first and second passages in said drum, a fixed restriction in said first passage for restricting fluid flow to said chamber upon admission of fluid pressure to said passage, a second valve in said second drum passage movable in response both to centrifugal force and to fluid pressure admitted to said second passage to permit unrestricted fluid flow to said chamber, said second valve being movable in response to pressure rise in said chamber to block off fluid flow to said chamber through said second passage.

2. In a transmission, a rotatable clutch drum, an engageable and releasable clutch in said drum, fluid pressure responsive means for engaging and releasing said clutch forming with said drum a chamber adapted to receive fluid under pressure to engage said clutch, a fluid pressure source, valve means connected to said source for controlling admission of pressure to and exhaust of pressure from said chamber, passage means connecting said valve means to said chamber including a first passage and a second passage in said drum, said first passage including first and second branches, a restriction in said first branch passage providing a continuous restricted connection to said chamber, a ball valve in said second branch passage movable in response to fluid pressure admitted to said first passage and in response to centrifugal force to block off fluid flow to said chamber through said second branch of said first passage, said second passage including first and second branch passages, a valve in said first branch of said second passage movable in response to pressure admitted to said first branch of said second passage and in response to centrifugal force to connect said clutch chamber to said first branch of said second passage through said second branch of said second passage, said valve including a relatively large land responsive to pressure in said clutch chamber and effective upon rise of pressure in said clutch chamber to position said valve to block off said second branch of said second passage from said first branch of said second passage irrespective of centrifugal force and fluid pressure acting on said valve.

3. In a transmission, a rotatable clutch drum, an engageable and releasable clutch in said drum, fluid pressure responsive means for engaging said clutch forming with said drum a chamber adapted to receive fluid under pressure to engage said clutch, a fluid pressure source, a valve connected to said source effective in one position to connect said chamber to exhaust and effective in a second position to direct pressure to said chamber, passage means in said rotatable drum connected to and controlled by said valve, said passage means including a restricted passage for admitting fluid to said chamber through a restricted flow path, a by-pass passage for at times by-passing said restriction, a ball valve in said by-pass passage responsive to centrifugal force and to pressure admitted to said passage means from said first-mentioned valve to block off said by-pass passage, said ball being movable in response to fluid pressure in said chamber to open said by-pass passage irrespective of centrifugal force when said first-mentioned valve is positioned to connect said passage means to exhaust, said passage means including a second passage for admitting fluid to said chamber through a relatively unrestricted fluid flow path, a valve in said second passage for controlling fluid flow to said chamber through said second passage, said last-mentioned valve being movable by centrifugal force toward a position to permit unrestricted fluid flow to said clutch chamber through said second passage, fluid pressure responsive means responsive to fluid pressure delivered to said second passage for biasing said valve to permit unrestricted fluid flow from said second passage to said chamber, and additional fluid pressure responsive means responsive to fluid pressure in said chamber for biasing said valve to block off fluid flow to said chamber through said second passage upon a rise of pressure in said chamber, irrespective of centrifugal force and fluid pressure biasing said last-mentioned valve in opposition to the clutch chamber pressure.

4. In a transmission, a rotatable clutch drum, an engageable and releasable clutch in said drum, fluid pressure responsive means for engaging said clutch forming with said drum a chamber adapted to receive fluid under pressure to engage said clutch, a fluid pressure source, a clutch control valve connected to said source effective in one position to connect said chamber to exhaust and effective in a second position to direct pressure to said chamber to engage said clutch, passage means for delivering pressure from said valve to said chamber including first and second passages in said rotatable drum and connected hydraulically in parallel, a fixed restriction in said first drum passage for restricting fluid flow to said chamber, a valve in said second passage adapted to alternately open and close said second passage, a surface on said last-mentioned valve responsive to pressure in said second passage, said pressure in said second passage applying a thrust to said valve tending to position said valve to permit unrestricted fluid flow to said chamber through said second passage, a second surface on said last-mentioned valve response to pressure in said chamber, the area of said valve surface responsive to pressure in said chamber being greater than the area of said valve surface responsive to pressure in said second passage, said valve being movable upon partial clutch engagement to block off said second passage, said first passage being effective when said second passage is blocked off to deliver fluid to said chamber to complete the engagement of said clutch.

5. In a transmission, a rotatable clutch drum, an engageable and releasable clutch in said drum, fluid pressure responsive means for engaging said clutch forming with said drum a clutch apply chamber adapted to receive fluid under pressure to apply said clutch, a fluid pressure source, valve means connected to said source for controlling admission of pressure to and exhaut of pressure from said source, passage means controlled by said valve means including first and second passages in said drum, a restriction in said first passage providing a continuous restricted flow path for flow of fluid from said valve means to said chamber, a second passage in said drum connected in parallel with said first passage and presenting a second path for flow of fluid into said chamber from said valve means, a valve in said second passage, said drum being effective when rotated to rotate said valve to subject said valve to centrifugal force tending to position said valve to permit unrestricted fluid flow through said second passage, a fluid pressure responsive surface on said valve responsive to pressure delivered by said first-mentioned valve means, said pressure applying a thrust to said valve acting in assistance to said centrifugal force to position said valve to admit pressure to said chamber, a second surface on said valve responsive to pressure in said clutch chamber, the pressure in said clutch chamber applying a thrust to said second surface biasing said valve towards a position to block off fluid flow to said clutch chamber, said second valve surface being of greater area than said first-mentioned valve surface, said valve being movable upon partial engagement of said clutch to block off fluid flow to said clutch chamber through said second passage, said first passage being effective to deliver pressure to said clutch chamber through said restriction to complete the engagement of said clutch.

6. In a transmission, a rotatable clutch drum, an engageable and releasable clutch in said drum, fluid pressure responsive means for engaging said clutch and forming with said drum an expansible chamber adapted to receive fluid under pressure to engage said clutch, a fluid pressure source, a manually operable control valve connected to said source for controlling engagement and release of said clutch, passage means connecting said manual valve to said chamber including first and second passages in said drum, said manual valve being effective in a first position to connect said passages to exhaust and effective in a second position to direct pressure to both of said passages, a restriction in said first passage for restricting fluid flow from said manual valve to said chamber, a valve in said second passage effective in one position to permit unrestricted fluid flow from said manual valve to said chamber through said second passage and movable to a second position to block off fluid flow to said chamber through said second passage, rotation of said drum applying centrifugal force to said valve biasing said valve towards said first position, a first surface on said valve responsive to pressure delivered to said second passage by said manual valve for biasing said valve towards said first position, a second surface on said valve responsive to pressure in said chamber for biasing said valve towards said second position, said valve being movable from said first position to said second position in response to rise of pressure in said chamber before completion of engagement of said clutch, said first passage permitting fluid flow through said restriction to complete the engagement of said clutch upon movement of said valve from said first to said second position.

7. In a transmission, a rotatable clutch drum, an engageable and releasable clutch in said drum, fluid pressure responsive means for engaging said clutch disposed in said drum and forming with said drum a chamber adapted to receive fluid under pressure, a fluid pressure source, a valve connected to said source for controlling engagement and release of said clutch, passage means connecting said valve to said chamber, said passage means including first and second passages for admitting pressure to said chamber, said valve being effective in one position to direct pressure to said passage means and movable to a second position to connect said passage means to exhaust, said first passage including first and second branch passages, a restriction in said first branch passage for restricting fluid flow from said valve to said chamber, a dump valve in said second branch passage effective to block off fluid flow from said first-mentioned valve to said chamber through said second branch passage and effective to permit rapid exhaust of fluid from said chamber to said first-mentioned valve through said second branch passage, an additional valve in said second passage, fluid pressure responsive means responsive to pressure delivered to said second passage by said first-mentioned valve for biasing said additional valve to permit fluid flow to said chamber through said second passage, second fluid pressure responsive means responsive to pressure in said chamber for biasing said additional valve to block off fluid flow through said second passage, said valve being movable to block off said second passage upon partial clutch engagement, said restriction permitting flow of fluid from said first-mentioned valve to said chamber to complete the engagement of said clutch.

8. In a transmission, a rotatable clutch drum, an engageable and releasable clutch in said drum, fluid pressure responsive means for engaging said clutch forming with said drum a chamber adapted to receive fluid under pressure, a fluid pressure source, a manual valve connected to said source for controlling engagement and release of said clutch, passage means connecting said manual valve to said chamber including first and second passages formed in said drum, a first dump valve in said drum for exhausting fluid from said chamber, said first dump valve being movable to a closed position to prevent exhaust of fluid therethrough upon rise of pressure in said chamber and movable to an open position in response to rotation of said drum upon exhaust of fluid from said chamber, passage means connecting said manual valve to said chamber, said manual valve being effective in one position to connect said passage means to exhaust and effective in a second position to direct pressure from said source to said passage means, said passage means including first and second passages, said first passage including first and second branches, a restriction in said first branch providing a continuous path for flow of fluid from said manual valve to said chamber, a second dump valve disposed in said second branch passage and movable in response to fluid pressure delivered to said first passage to block off said second branch passage, said second dump valve being movable in response to pressure in said chamber to permit exhaust of fluid from said chamber through said second branch passage when said manual valve is positioned to connect said passage means to exhaust, a valve in said second passage for controlling flow of fluid from said manual valve to said chamber through said second passage, fluid pressure responsive means responsive to pressure in said second passage for biasing said last-mentioned valve to a position permitting flow of fluid through said second passage to said chamber, additional fluid pressure responsive means responsive to fluid pressure in said chamber for biasing said valve to a position to block off said second passage, said valve being movable to said last-mentioned position upon partial engagement of said clutch, said restricted branch passage being effective to deliver pressure to said chamber to complete the engagement of said clutch.

References Cited by the Examiner
UNITED STATES PATENTS

| | | | |
|---|---|---|---|
| 2,740,512 | 4/1956 | Fischer | 192—103 X |
| 2,756,851 | 7/1956 | Collins | 192—109 |
| 2,864,479 | 12/1958 | Schindler | 192—103 |
| 2,869,701 | 1/1959 | Yokel | 192—109 X |
| 2,876,743 | 3/1959 | Maki. | |

DAVID J. WILLIAMOWSKY, *Primary Examiner.*

BENJAMIN W. WYCHE III, *Examiner.*